July 15, 1947.  A. J. WAYMAN  2,424,008
CABLE RACK
Filed Oct. 6, 1942   2 Sheets-Sheet 1
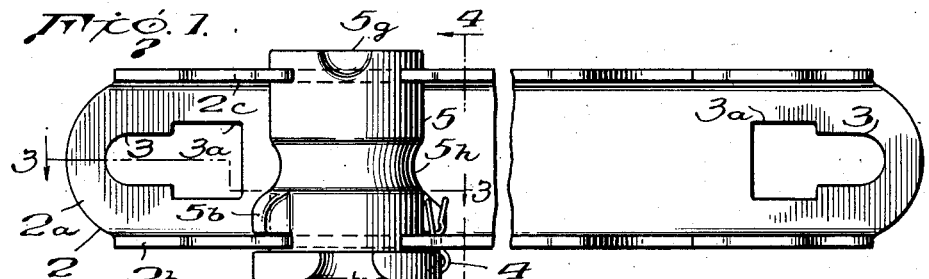
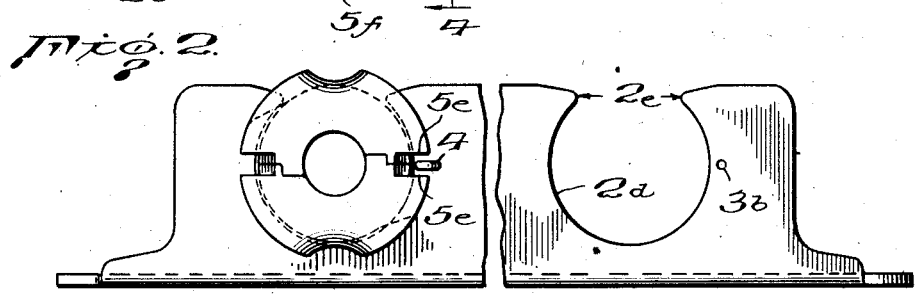
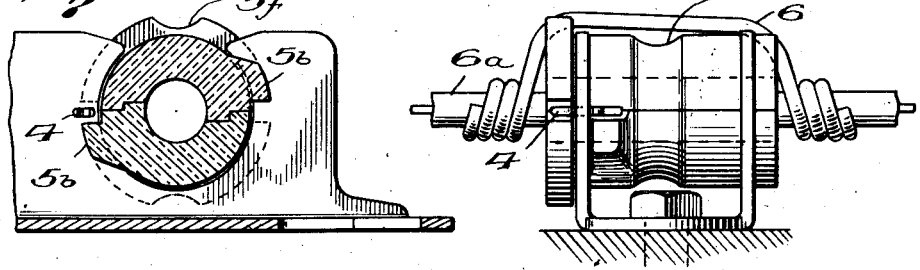
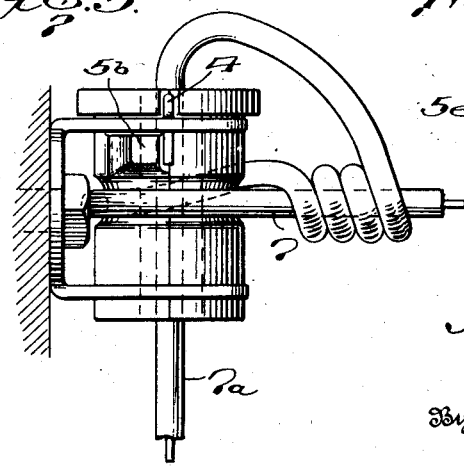
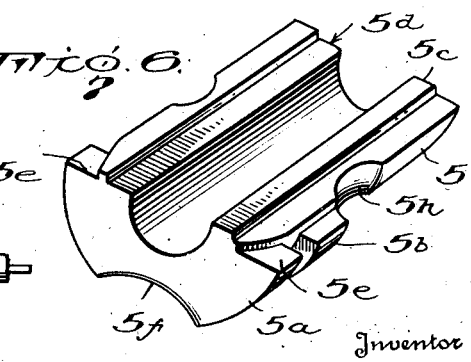
Inventor
Albert J. Wayman
By Ralph B. Stewart
Attorney July 15, 1947.　　A. J. WAYMAN　　2,424,008
CABLE RACK
Filed Oct. 6, 1942　　2 Sheets-Sheet 2
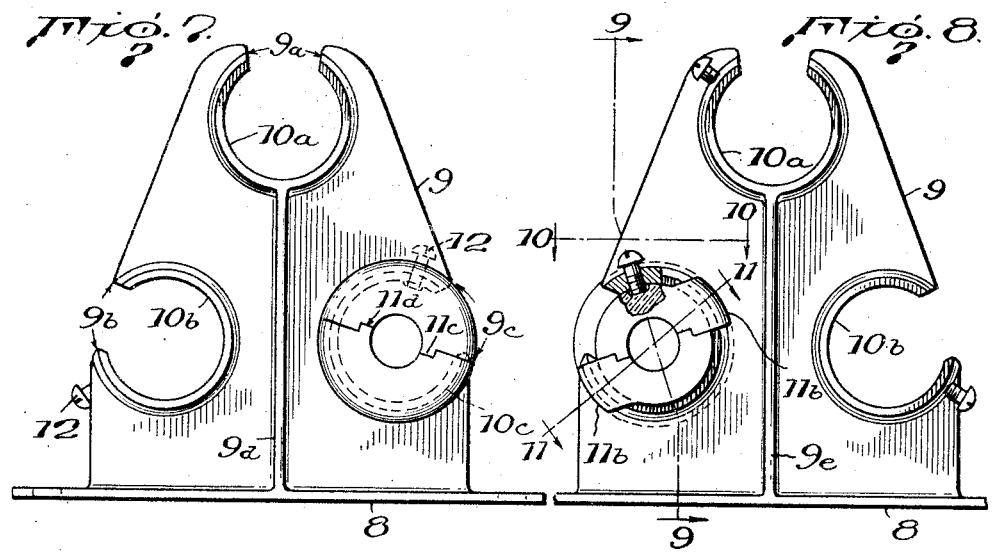
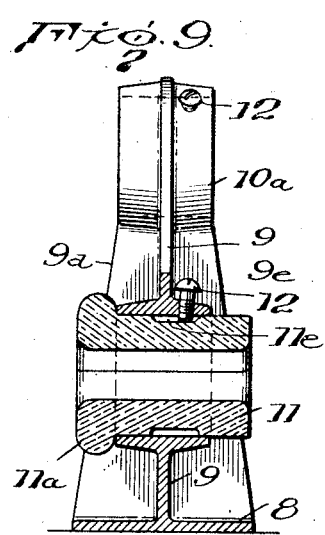
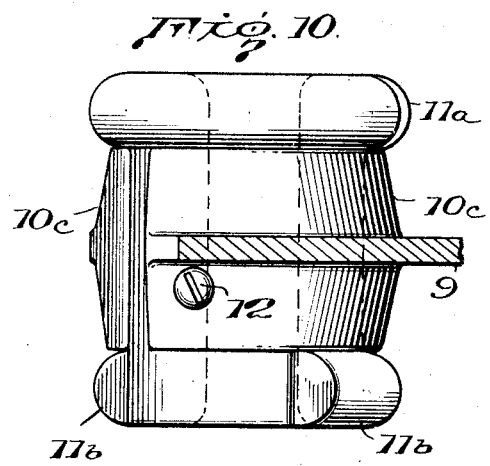
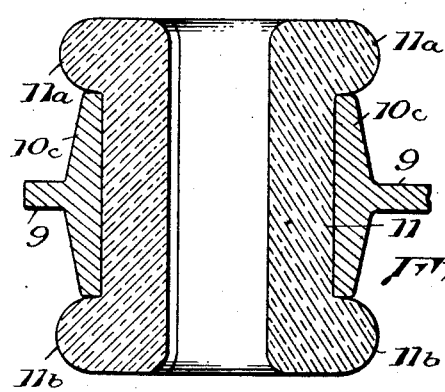
Inventor
Albert J. Wayman
By Ralph B. Stewart
Attorney Patented July 15, 1947

2,424,008

UNITED STATES PATENT OFFICE 2,424,008

CABLE RACK

Albert J. Wayman, Youngstown, Ohio

Application October 6, 1942, Serial No. 461,006

6 Claims. (Cl. 174—155)

This invention relates to a cable rack.

An object of the invention is to devise a cable rack of simple construction for supporting one or more electric cables or conductors.

A further object is to devise a cable rack which is easily assembled and installed.

Another object is to devise a cable rack which may be installed on existing lines without disturbing the lines.

Still another object is to devise a cable rack using split insulators where the two halves of the insulator are identical.

An additional object is to provide locking means for retaining the insulator halves in position while permitting ready removal.

My invention is especially useful for supporting conductors carrying alternating current, although it is not limited to this particular application. Heretofore, one common form of cable rack has involved the use of a split insulator supported in a split ring, the lower half of which is formed of iron and the upper half of brass in order to avoid the formation of a complete magnetic circuit around the conductor passing through the insulator. In the rack of my invention, I avoid the use of brass, and I also reduce to a minimum the amount of iron required for supporting the insulators. Also, in my cable rack, the metallic support does not extend entirely around the insulator and thereby avoids the establishment of appreciable eddy currents in the insulator support.

Two forms of my cable rack are illustrated in the accompanying drawing in which Figures 1 to 6 illustrate a "channel" type of rack while Figures 7 to 13 illustrate a "delta" type of rack.

Figure 1 is a plan view of the channel rack showing one insulator in position, the rack being broken longitudinally for the purpose of showing the rack on an enlarged scale;

Figure 2 is a side elevational view of Figure 1 showing an insulator in one conductor position and the other conductor position without an insulator;

Figure 3 is a sectional view taken along the line 3—3 of Figure 1;

Figure 4 is a sectional view taken along the line 4—4 of Figure 1 showing the rack used on a horizontal support for supporting conductors in a horizontal position;

Figure 5 is an end view of the channel rack supported on a vertical wall and serving as an anchor for dead-ending a conductor;

Figure 6 is a perspective view of one half of the conductor insulator shown in Figures 1 to 5, the two halves being identical;

Figure 7 is a side elevational view of another form of cable rack for supporting three conductors in delta formation, only one split insulator being shown in position;

Figure 8 is a side elevational view of the opposite side of the rack shown in Figure 7, a portion of the insulator being broken away;

Figure 9 is a sectional view of Figure 8 taken along the line 9—9;

Figure 10 is an enlarged sectional view of Figure 8 taken along line 10—10;

Figure 11 is an enlarged sectional view of Figure 8 taken along line 11—11;

Figure 12 is a view showing the inner face of one half of the split insulator; and Figure 13 is a view showing the reverse side of the insulator half shown in Figure 12.

Referring to the drawing, the insulator support shown in Figures 1 to 5 is formed as a channel member 2 having a web portion 2a and two side flanges 2b and 2c. This channel member may be formed of stock channel material, but I prefer to stamp the member from flat plate stock and then bend the side flanges 2b and 2c at right angles to the web portion 2a. Flanges 2b and 2c are provided with insulator apertures 2d arranged in line with each other in the two flanges, and the top edges of the flanges 2b and 2c are notched at 2e so that the apertures 2d are open or slotted at the top side. Suitable screw receiving apertures 3 are formed in each end of web portion 2a by which the insulator support may be mounted upon any suitable supporting surface. The screw apertures are enlarged as shown at 3a so that they may be passed over the heads of screws which have already been mounted in the support. Apertures 2d, 3, 3a may be all formed in the same stamping operation when the insulator support is stamped from the flat sheet stock. The insulator support may be made as long as would be required for any particular number of conductors to be supported. For example, the cable rack shown in Figures 1 and 2 might be a three conductor rack, but the central apertures for the central conductor have not been shown because of lack of space on the drawing. It will be understood that the insulator apertures would be spaced along the insulator support by distances to secure the necessary separation between the conductors. I prefer to form the insulator support from iron plate and after the support is given its final shape it is covered with a galvanized zinc coating.

As shown in Figure 3, a small hole 3b is formed in each flange on one side of each insulator aperture for receiving a cotter pin 4, the function of which will be described hereinafter.

The split insulator sleeves which are mounted in apertures 2d are formed of identical halves, one of which is shown in perspective in Figure 6. As will be seen, each insulator half is formed of a semi-cylindrical body 5 having a radial flange 5a formed at one end thereof and a second radial flange 5b spaced from flange 5a by a distance to permit one of the flanges 2b or 2c of the insulator support to be positioned between the two radial flanges. Furthermore, radial flange 5b is limited in periphery so that it will pass through the slot 2e formed in the insulator apertures 2d when the insulator half is passed axially into the aperture. The inner face of the semi-cylindrical body 5 is provided with a rib 5c which engages a complementary depressed portion 5d on another insulator half when two halves are assembled to form one insulator. This construction maintains the two halves in correct axial alignment. Since the two insulator half-parts are identical, the abutting faces of the two parts are arranged on a dividing plane which is symmetrical with respect to any radial plane passing through the center of the insulator sleeve. The flange 5a is notched radially on the inner faces to form shoulders 5e—5e. When two insulator halves are assembled, the spaced shoulders formed by these notches are positioned on opposite sides of the cotter pin 4 as shown in Figures 2 and 3. While two notches are shown on opposite sides of the flange 5a, it will be obvious that only one notch may be provided on one side of the radial flange. Radial flange 5a is also provided with a smooth rounded notch 5f at the center thereof for receiving and positioning the tying wire 6 as shown in Figure 4. A similar smooth rounded notch 5g is formed in the outer center of the semicylindrical body 5 for the same purpose. Finally, a rounded groove 5h is formed on the outer surface of body 5 transversely thereof substantially at the center of the body for receiving and holding a dead-ended conductor 7 as shown in Figure 5.

In assembling the split insulators in the support, one insulator half may be inserted in the aligned supporting apertures 2d by passing the half through the slots 2e so that radial flanges 5a and 5b lie on opposite sides of supporting flange 2b (or 2c). The second insulator half is then inserted axially into the aperture until the radial flange 5b comes into contact with supporting flange 2b (or 2c), it being understood that the second insulator half is in proper registering relation with the face of the first insulator half. Both insulator halves are now rotated until the radial flange 5b on the second insulator half comes opposite the slot 2e in the supporting flange, and then the second half is pushed forward until the flange 5a abuts against the supporting flange 2b. The two halves are now rotated until the shoulders 5e—5e are positioned on opposite sides of the hole 3b and the cotter pin 4 is inserted in the flange 2b to prevent rotation of the split insulator, see Figures 1 and 2. In this position, radial flanges 5a and 5b are positioned on opposite sides of the supporting flange 2b and prevent appreciable axial movement of the split insulator in its support. Cotter pin 4 prevents the insulator from being rotated to a position where one of the parts might be withdrawn by passing the radial flange 5b through slot 2e.

Where the rack is to be installed on the existing line, the supporting channel is mounted in proper position without the split insulators. The conductors are placed in the apertures and the insulators are mounted in the channel in proper position on the conductors by placing each half insulator on the conductor to one side of the channel and then sliding the insulator half along the conductor and into the supporting apertures, the insulator part being rotated on the conductor to a position where the radial flange 5b will pass through the slots 2e. When both insulator halves have been positioned as shown in Figures 1 and 2, the cotter pin 4 is inserted in the hole 3b.

Figure 4 shows the rack used for supporting a horizontal conductor 6a which is tied to the split insulator by tying wire 6.

Figure 5 shows the rack mounted on a vertical support and employed for dead-ending a conductor 7. The central opening in the split insulator may be used to guide the vertical end of the conductor 7a as shown.

Another form of my invention is illustrated in Figures 7 to 13, inclusive. In this arrangement the supporting structure for the split insulators is formed of a base plate 8 and a web plate 9 supported on plate 8 at right angles thereto. Plate 9 is provided with three apertures arranged in "delta" formation for supporting split insulators, the edges of the plate adjacent the apertures being slotted as shown at 9a, 9b and 9c. Each aperture has a slotted ring or sleeve construction surrounding the edge thereof indicated at 10a, 10b and 10c. In order to provide transverse stiffening, lateral flanges 9d and 9e are positioned at the center of web plate 9 and at right angles thereto, extending from base plate 8 up to and joining sleeve 10a. The supporting structure described immediately above is preferably formed of cast iron, but it is obvious that it may be fabricated from parts cut from plate and tubular stock, the parts being joined together by welding or other known process.

The split insulator for the rack shown in Figures 7 and 8 is formed of identical halves but is somewhat different from the insulator used in the rack shown in Figures 1 and 2. As shown in Figures 12 and 13, each insulator half is formed of a semi-cylindrical body 11 having a radial flange 11a formed at one end and a short radial flange 11b formed at the other end, the flange 11b being short enough (peripherally) to pass through the slots formed in supporting sleeves 10a, 10b and 10c. On one side of the inner face of the insulator half, a raised longitudinal portion 11c is provided to engage a longitudinal depressed portion 11d formed in the face of the insulator on the opposite side of the conductor groove. A depression or shallow groove 11e is formed in the center of the insulator body 11 on the outer rounded surface thereof as shown in Figure 13 to provide means for locking the insulator against rotation about its axis.

In assembling the split insulator in the supporting sleeves, the procedure is the same as described above for Figures 1 and 2 except that when the two halves are located in the sleeves, they are rotated together until the groove 11e on one of the halves comes opposite a locking screw 12 provided on each sleeve. The locking screw is driven into the groove and the shoulders of the groove cooperate with the screw to prevent rotation of the insulator to a position where the short radial flange 11b on one of the insulator halves is in registry with the slot in the sleeve. It will thus be seen that radial flanges 11a and 11b prevent appreciable axial movement of the insulator within the supporting sleeve, and screw 12 prevents rotation of the split insulator to a position where one of the parts may be removed.

While the arrangement shown in Figure 7 is designed to support three insulator units, it will be obvious that the design may be extended to cover more or less units. For example, a suitable two-unit rack would have a construction like that shown in Figure 7 except that web plate 9 would not extend upwardly any farther than is necessary to support sleeves 10b and 10c. By making groove 11e elongated and centered between radial flanges 11a and 11b, the groove will have proper cooperation with locking screw 12 regardless of whether the flange 11a is on the same side of web 9 as screw 12 or on the opposite side.

In both forms of my invention, the amount of magnetic material is reduced to a minimum, and in both cases the split insulators are supported in a structure which does not extend entirely around the insulators, thereby avoiding excessive eddy current losses in the insulator support. This arrangement also reduces the magnetic leakage about each conductor over an arrangement where an iron ring extends entirely around the conductor, and thereby reduces the inductive reactance of the line. Also, the arrangement of Figure 7 is especially useful for a three phase transmission line since the conductors are supported in equi-spaced delta formation, thereby equalizing the reactance of the three phases and permitting the three conductors to be supported in relatively close relation.

What I claim is:

1. An insulator support having a round hole formed therein with a slot leading from the hole to the outside of the support, a split insulator sleeve supported in said hole and comprising two identically shaped semi-cylindrical parts having abutting faces arranged on a dividing plane which is symmetrical with respect to any radial plane passing through the center of said sleeve, each half-part having formed thereon spaced radial flanges positioned to engage opposite sides of said support and one of said flanges having a width less than the width of said slot, and stop means carried by said support and positioned to engage a shoulder on one of said half-parts to prevent rotation of said insulator in said hole, each of said half-parts having shoulders for cooperating with said stop means to hold said insulator in a position where the narrow radial flanges on both of said half-parts are out of registry with said slot, and said stop means being retractible from engagement with said shoulder to permit rotation of said half parts.

2. A structure according to claim 1 wherein the shoulders on the insulator half-parts are formed on one radial flange to provide a notch in said flange, and the stop means comprises a pin supported on said insulator support and extending into said notch.

3. A structure according to claim 1 wherein the shoulders on the insulator half-parts comprise opposite walls of a groove formed in the outer cylindrical surface of said parts, and the stop means comprises a screw threaded in a portion of said insulator support and extending into the groove on one of said parts.

4. A structure according to claim 1 wherein said insulator support comprises one side flange of a channel member and the split insulator extends into a supporting slotted hole formed in the opposite side flange of said channel member.

5. A structure according to claim 1 wherein said insulator support comprises a slotted sleeve supported by a web plate.

6. An insulator support having a round hole formed therein with a slot leading from the hole to the outside of the support, a split insulator sleeve supported in said hole and comprising two identically shaped semi-cylindrical parts, each half-part having formed thereon spaced radial flanges positioned to engage opposite sides of said support and one of said flanges having a width less than the width of said slot, and stop means carried by said support and positioned to engage a shoulder on one of said half-parts to prevent rotation of said insulator in said hole, each of said half-parts having shoulders for cooperating with said stop means to hold said insulator in a position where the narrow radial flanges on both of said half-parts are out of registry with said slot, said radial flanges on said insulator parts being located at the ends of said parts, and said insulator support comprising a slotted sleeve surrounding said split-insulator sleeve and extending substantially throughout the space between said radial flanges.

ALBERT J. WAYMAN.

REFERENCES CITED

The following references are of record in the file of this patent:

UNITED STATES PATENTS

| Number | Name | Date |
|---|---|---|
| 70,132 | Teller et al. | Oct. 22, 1867 |
| 138,489 | Eby et al. | May 6, 1873 |
| 120,884 | Kidwell | Nov. 14, 1871 |
| 823,912 | Biele | June 19, 1906 |
| 1,544,436 | Easterday et al. | June 30, 1925 |
| 491,362 | Lane | Feb. 7, 1893 |
| 584,235 | Nesmith et al. | June 8, 1897 |